United States Patent
Ross et al.

(10) Patent No.: US 7,159,377 B2
(45) Date of Patent: Jan. 9, 2007

(54) POWERED APPLIANCE AND ACCESSORY

(75) Inventors: James J. Ross, DePere, WI (US); Robert L. Fuller, Manitowoc, WI (US); David J. Merten, Manitowoc, WI (US); Jay Z. Muchin, Manitowoc, WI (US)

(73) Assignees: M Group, Inc., Manitowoc, WI (US); JRF Enterprises, LLC, Manitowoc, WI (US)

( * ) Notice: Subject to any disclaimer, the term of this patent is extended or adjusted under 35 U.S.C. 154(b) by 78 days.

(21) Appl. No.: 10/645,421

(22) Filed: Aug. 21, 2003

(65) Prior Publication Data

US 2004/0050028 A1    Mar. 18, 2004

Related U.S. Application Data

(60) Provisional application No. 60/420,528, filed on Oct. 23, 2002, provisional application No. 60/406,395, filed on Aug. 27, 2002.

(51) Int. Cl.
*A01D 69/00* (2006.01)

(52) U.S. Cl. .......................... 56/10.8; 56/10.5; 37/249; 37/253; 172/42

(58) Field of Classification Search ................ 56/10.8, 56/11.2, 11.3, 11.1, 11.5, 11.6, 11.7, 11.8; 180/19.1, 19.2, 19.3; 37/244, 249, 253; 172/42
See application file for complete search history.

(56) References Cited

U.S. PATENT DOCUMENTS

| | | | | |
|---|---|---|---|---|
| 1,435,311 A | * | 11/1922 | Knight | ................ 138/110 |
| 2,535,466 A | | 12/1950 | Turner | |
| 3,203,653 A | * | 8/1965 | Hall | ................ 248/62 |
| 3,228,177 A | * | 1/1966 | Coates | ................ 56/10.5 |
| 4,167,221 A | | 9/1979 | Edmonson et al. | |
| 4,218,814 A | * | 8/1980 | Hodapp | ................ 29/450 |
| 4,231,208 A | * | 11/1980 | Willox | ................ 52/741.3 |
| 4,362,228 A | | 12/1982 | Plamper et al. | |
| 4,476,643 A | * | 10/1984 | Hilchey et al. | ................ 37/245 |
| 4,573,307 A | * | 3/1986 | Wick | ................ 56/11.8 |
| 4,667,459 A | * | 5/1987 | Scanland et al. | ................ 56/11.3 |
| 4,713,271 A | * | 12/1987 | Searl et al. | ................ 428/36.5 |
| D295,865 S | * | 5/1988 | Rosenblad | ................ D15/18 |
| 4,810,009 A | * | 3/1989 | Legris | ................ 285/39 |
| 4,996,088 A | * | 2/1991 | Knittel et al. | ................ 428/40.9 |
| 5,050,884 A | * | 9/1991 | Flory | ................ 473/282 |
| 5,146,735 A | | 9/1992 | McDonner | |
| 5,215,319 A | * | 6/1993 | Farris | ................ 280/33.992 |
| 5,261,214 A | | 11/1993 | Wollersheim | |
| 5,511,367 A | | 4/1996 | Powers et al. | |
| 5,511,445 A | * | 4/1996 | Hildebrandt | ................ 74/558.5 |
| 5,784,868 A | | 7/1998 | Wadzinski et al. | |
| 6,016,846 A | * | 1/2000 | Knittel et al. | ................ 138/128 |
| 6,065,764 A | * | 5/2000 | Moseley | ................ 280/33.992 |
| 6,082,083 A | * | 7/2000 | Stalpes et al. | ................ 56/11.6 |

(Continued)

*Primary Examiner*—Árpád Fábián Kovács
(74) *Attorney, Agent, or Firm*—Rathe Patent & IP Law

(57) ABSTRACT

A powered appliance includes a working member, a handle operably coupled to the working member and a control movable between a first position proximate the handle in which movement of the working member is permitted and a second position distant the handle in which movement of the working member is at least reduced. One of the handle and the control is configured to at least partially receive the other of the handle and the control when in the first position. At least one of the handle and the control includes a flexible member adjacent the other of the handle and the control.

38 Claims, 2 Drawing Sheets

U.S. PATENT DOCUMENTS 6,101,678 A * 8/2000 Malloy et al. ................ 16/438
6,105,348 A * 8/2000 Turk et al. ................... 56/10.5
6,467,507 B1 * 10/2002 Engle ......................... 138/112
2003/0084655 A1 * 5/2003 Rush et al. .................. 56/194

* cited by examiner

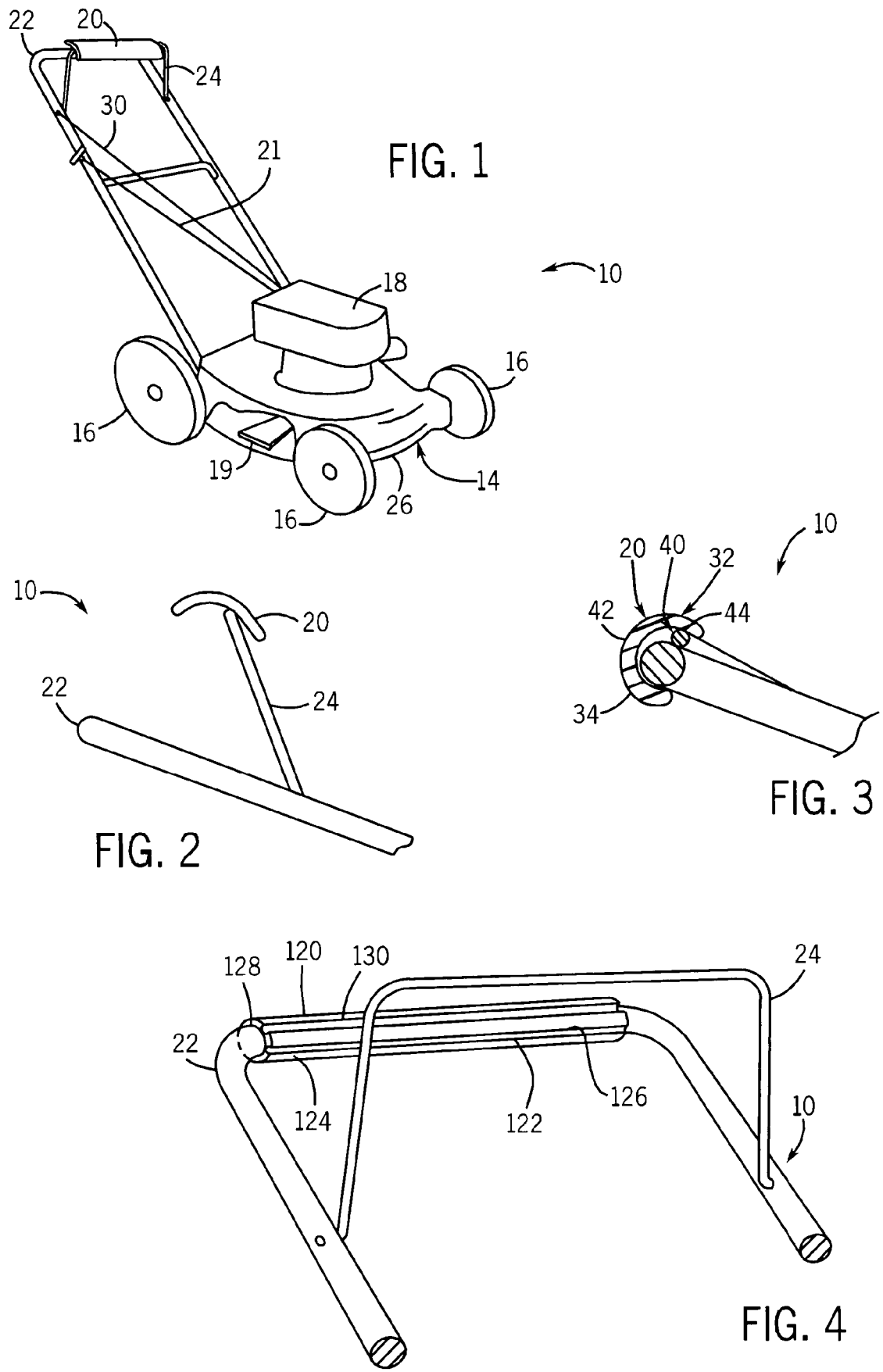

POWERED APPLIANCE AND ACCESSORY

CROSS-REFERENCE TO RELATED PATENT APPLICATIONS

The present application claims priority from co-pending U.S. Provisional Patent Application Ser. No. 60/406,395, filed on Aug. 27, 2002 and co-pending U.S. Provisional Patent Application Ser. No. 60/420,528, filed on Oct. 23, 2002, and having the same inventors and the same title as the present application. The full disclosure of both provisional patent applications is hereby incorporated by reference.

BACKGROUND OF THE INVENTION

Powered appliances come in a variety of forms and are used for a variety of different applications. Examples of powered appliances include non-riding lawnmowers, hedge trimmers, tillers, chain saws, edgers, snowblowers, wood choppers, and the like. Whether powered by batteries, electrical motors or gas engines, such powered appliances typically include a working member which moves to perform the desired task. For safety reasons, most powered appliances additionally include a movable control that must be held adjacent to a handle of the powered appliance to enable operation of the working member. When the control is moved away from the handle, movement of the working member is either completely stopped or is sufficiently slowed to minimize the risk of injury from accidental contact of the appliance operator with the working member.

One example of such a powered appliance is a non-riding lawnmower which has a control commonly known as a "kill bar". Other names for the kill bar are engine stop lever, safety brake control handle, operator presence control or blade control member. When the kill bar is held adjacent to the handle, the working member or blade rotates. When the kill bar is distant the handle, the blade is stopped or slowed. In many applications, power to the blade is cessated. In alternative applications, rotation of the blade is braked or otherwise stopped. In some non-riding lawnmowers that are self-propelled, an additional control or "kill bar" is provided for implementing the self-propelling feature. In such applications, the working member or propulsion drive train is actuated when the kill bar is held adjacent to the handle.

Although this safety mechanism is common on non-riding lawnmowers, it also results in a very uncomfortable operation of the lawnmower. In particular, when the kill bar is positioned adjacent to the handle, the two members form an awkward, uneven surface which is difficult and uncomfortable to grasp. Exacerbating this discomfort is the relentless vibration of the lawnmower itself. In addition to being not only tedious and uncomfortable, vibration of the lawnmower frequently results in the operator's hands becoming pinched between the two members.

BRIEF DESCRIPTION OF THE DRAWINGS

FIG. 1 is a perspective view of one example of a powered appliance including an example of an accessory of the present invention.

FIG. 2 is a fragmentary side elevational view of the appliance and accessory of FIG. 1 illustrating a control in a non-operational position.

FIG. 3 is a sectional view of the appliance and accessory of FIG. 1 illustrating the control in an operational position.

FIG. 4 is a fragmentary perspective view of the appliance of FIG. 1 and a first alternative embodiment of the accessory of FIG. 1, illustrating the control in the non-operational position.

DETAILED DESCRIPTION OF THE EXAMPLE EMBODIMENTS

Figure 5:
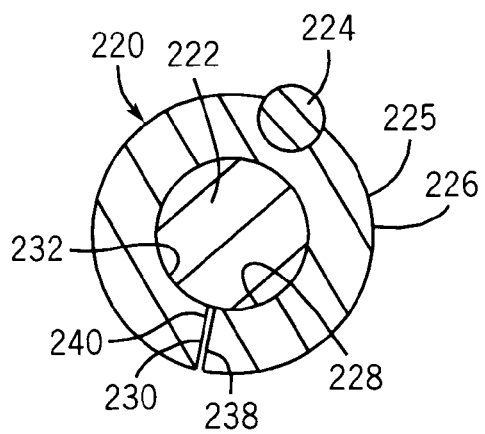
FIG. 5 is a sectional view of the appliance and accessory of FIG. 4 illustrating the control in the operational position.

FIG. 1 is a perspective view of one example of a powered appliance 10 (illustrated as a non-riding powered lawnmower) including an accessory 20. Powered appliance 10 generally includes chassis or frame 14, wheels 16, power source 18, working member 19, handle 22 and control 24. Chassis 14 generally comprises a structure configured to support power source 18 and working member 19. In the particular embodiment illustrated in which powered appliance 10 comprises a non-riding powered lawnmower, chassis 14 additionally includes a cover or shield portion 26 at least partially extending about working member 19. The exact configuration of chassis 14 may vary depending upon the type and function of powered appliance 10.

Wheels 16 are rotatably supported by chassis 14 and are configured to facilitate movement of powered appliance 10. In one embodiment in which powered appliance 10 is self propelled, one or more of wheels 16 may be operationally coupled to a drive train or transmission. In another embodiment in which powered appliance 10 is not self propelled, wheels 16 may freely rotate. In particular applications in which powered appliance 10 is not moved across the ground or other surface, wheels 16 may be omitted.

Power source 18 generally comprises a conventionally known or future developed device configured to provide mechanical energy to power or move at least working member 19. Power source 18 is coupled to working member 19 either directly or by a drive train. Examples of power source 18 include an electric motor, a battery-powered motor or a gas or fuel-driven powered motor or engine. In the particular embodiment illustrated, power source 18 includes a recoil cable 21 configured to facilitate the starting of power source 18 upon being pulled.

Working member 19 generally comprises a member of powered appliance 10 configured to move to perform a desired task upon the surrounding environment external to the appliance. In the particular embodiment illustrated in which powered appliance 10 comprises a lawnmower, working member 19 comprises a blade which works on the surrounding environment, grass. In alternative embodiments, working member 19 may take a variety of other conventionally known or future developed forms such as the blades or working members of hedge trimmers, tillers, chain saws, edgers, snowblowers, wood choppers and the like. Working member 19 is generally driven by power source 18.

Handle 22 generally comprises a structure extending from chassis 14 configured to be grasped by a user of powered appliance 10 to facilitate manipulation or movement of powered appliance 10. In the particular embodiment illustrated, handle 22 has a generally U-shaped tubular member pivotally coupled to chassis 14. In alternative embodiments, handle 22 may have any one of a variety of alternative configurations depending upon the type of powered appliance 10 in which handle 22 is employed and its function.

Control 24 generally comprises a movable member configured to be held adjacent to or at least near a portion of handle 22 to enable operation of working member 19. When control 24 is moved away from handle 22, movement of working member 19 is either completely stopped or is sufficiently slowed to minimize the risk of injury from accidental contact of an appliance operator with working member 19. In the particular embodiment illustrated in which powered appliance 10 comprises a non-riding lawnmower, control 24 is commonly known as a "kill bar". Other names for control 24 are engine stop lever, bale arm, safety brake control handle, operator presence control or blade control member. When control 24 is held adjacent to handle 22, working member 19 rotates. In one embodiment, when control 24 is distant handle 22, power being provided to working member 19 is cessated. In alternative embodiments, when control 24 is distant handle 22, rotation or movement of working member 19 is braked or otherwise stopped.

In alternative embodiments, powered appliance 10 may be provided with an additional control member or "kill bar" to provide for implementing a self-propelling feature of powered appliance 10. In still alternative embodiments, control 24 illustrated in FIG. 2 may alternatively be configured to implement the self-propelling feature of powered appliance 10. For example, when control 24 is positioned adjacent or at least near to handle 22, torque is provided to at least one of wheels 16 by power source 18 through a drive train or transmission (not shown) to propel appliance 10. When control 24 is distant handle 22, either power being supplied to wheels 16 is cessated or movement or rotation of wheels 16 is braked.

In the particular embodiment, control 24 is coupled to power source 18 by linkage 30 in a conventionally known fashion. In alternative embodiments, control 24 may be coupled to power source 18 by various other known methods or devices. For purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

In the particular embodiment illustrated, control 24 generally pivots between the operational position in which control 24 is proximate to handle 22 and the non-operational position in which control 24 is distant handle 22. In the particular embodiment illustrated, control 24 is resiliently biased towards the non-operational position by a spring or other biasing device. In alternative embodiments, control 24 may alternatively move relative to handle 22 by sliding or other fashions depending upon the type and function of powered appliance 10.

In the particular embodiment illustrated, powered appliance 10 comprises a conventionally known non-riding powered lawnmower, whether self propelled or pushed. Each of chassis 14, wheels 16, power source 18, working member 19, blade 22, control 24 and linkage 30 is conventionally known. In alternative embodiments, power appliance may comprise a future developed powered appliance having alternative elements. Those elements provided to powered appliance 10 may have various configurations depending upon the type of powered appliance 10 and its function.

ACCESSORY 20

Accessory 20 generally comprises a flexible member coupled to control 24 and configured to be flexed or deformed into close proximity with handle 22 when control 24 is positioned proximate to handle 22 during operation of working member 19. For purposes of this disclosure, the term "flexible" shall mean that the material or structure may be flexed or deformed as a result of a normal amount of force being applied to the material or structure by a person's hand without resulting in excessive fatigue of the person's hand for a period of time during which the powered appliance would normally be used during one continuous session. For purposes of this disclosure, the term "compressible" shall mean that the material or structure may be compressed so as to occupy a reduced volume as a result of a normal amount of force being applied to the material or structure by a person's hand without resulting in excessive fatigue of the person's hand for a period of time during which the powered appliance would normally be used during one continuous session. As best shown by FIGS. 2 and 3, accessory 20 is configured to move with control 24 and is configured to deform so as to partially wrap about handle 22. In alternative embodiments, accessory 20 may have a predefined shape so as to releasably mate with handle 22 when control 24 is positioned proximate to handle 22. For example, accessory 20 may alternatively have the generally arcuate cross-sectional shape shown in FIG. 3 without being flexed or deformed, wherein accessory 20 pivots about a living or mechanical hinge (such as at hinge point 32) so as to enable the wrapping portion 34 of accessory 20 to be pivoted about handle 22 or to be pivoted away from handle 22, facilitating movement of control 24 away from handle 22 such as when the operator of appliance 10 releases control 24. In such an embodiment, pivoting portion 34 of accessory 20 is sufficiently flexible so as to enable pivoting portion 34 to release handle 22, allowing control 24 to pivot away from handle 22 when control 24 is released by the operator of appliance 10.

As further shown by FIG. 3, when control 24 is in the operational position, accessory 20 generally extends across or spans juncture 40 of control 24 and handle 22. As a result, accessory 20 cooperates with control 24 and handle 22 to provide a smooth surface across juncture or joint 40 to prevent accidental pinching of the operator's hands at this junction. In the particular embodiment illustrated, accessory 20 also includes at least one exterior or interior layer of compressible material providing accessory 20 with a soft grip. As a result, accessory 20 further reduces vibration generally resulting from the operation of power source 18 and working member 19. Examples of material that may be used to provide accessory 20 with compressibility include foams, such as urethane foam. Alternatively, accessory 20 may include one or more inflated chambers, wherein the walls of the chambers are flexible to provide compressibility. Although less desirable, accessory 20 may alternatively not be substantially compressible but merely flexible. Examples of flexible materials include rubber, synthetic rubber, SANTOPRENE thermoplastic elastomer, natural and synthetic fabrics and the like.

In addition to being flexible, accessory 20 may also be compressible as well as moisture absorbent. For example, the exterior surface 42 of accessory 20 includes a moisture absorbent layer of one or more materials to absorb and/or wick away the perspiration from the operator's hands when operating appliance 10. For example, accessory 20 may comprise a layer of foam and an additional exterior layer of moisture absorbent cloth affixed to the layer of foam. Although less desirable, accessory 20 may alternatively omit such a layer of compressible material.

In the embodiment shown in FIG. 3, accessory 20 includes an adhesive area 44 configured to adhere accessory 20 to control 24. This adhesive portion or area may initially be covered by a releasable strip of protective paper which is removed to expose the adhesive surface. In an alternative embodiment, accessory 20 is configured to be releasably attached to control 24. In one embodiment, accessory 20 may include a rigid C-shaped portion configured to flex while snapping or clamping about control 24. In such an application, the C-shaped member may be formed from a resiliently flexible polymer which is glued, sewn or otherwise coupled to the remainder of accessory 20. In still another embodiment, a separate resiliently flexible clip may be used to secure the remainder of accessory 20 to control 24.

Although accessory 20 is illustrated as extending across substantially the entire gripping length of control 24, accessory 20 may alternatively be configured to be positioned along selected portions of control 24. For example, accessory 20 may be configured to be releasably coupled to control 24 at particular locations as selected by the operator of appliance 10 such as locations where the operator usually grips control 24. Although accessory 20 is illustrated as a single member, accessory 20 may alternatively comprise a plurality of individual members which are coupled to control 24 at spaced-apart locations or adjacent to one another.

Although accessory 20 is illustrated as being coupled to control 24 and being configured to extend from control 24 into a position adjacent to handle 22, accessory 20 may alternatively be configured to be coupled to handle 22, wherein a free end of accessory 20 extends across the junction of control 24 and handle 22 to at least partially wrap about or extend adjacent to control 24. In such an alternative embodiment, accessory 20 may be coupled to handle 22 in a substantial identical fashion as described above in which accessory 20 was coupled to control 24.

Although accessory 20 has been described as being a separate accessory which is adhered or otherwise coupled to one of handle 22 and control 24 and configured to extend across junction 40 of handle 22 and control 24, accessory 20 may alternatively be formed as part of either handle 22 or control 24. For example, accessory 20 may alternatively be co-molded about or permanently affixed to one of handle 22 and control 24.

ACCESSORY 120

FIG. 4 is a fragmentary perspective view illustrating powered appliance 10 including accessory 120, a first alternative embodiment of accessory 20. Accessory 120 includes an elongate slit 122 axially extending along its entire length. Slit 122 enables adjacent end portions 124 and 126 to be spread apart for the insertion of handle 22 into an interior 128 of accessory 120. Upon interior 128 receiving handle 22, end portions 124 and 126 resiliently return their initial shape so as to envelope handle 22.

As further shown by FIG. 4, accessory 120 includes a preformed groove or channel 130 partially extending into the thickness of the tube forming accessory 120, axially extending along its entire length and configured to at least partially receive control 24 when control 24 is in the operational position. In one embodiment, channel 130 is sized to substantially receive the entire diameter of control 24. In another embodiment, channel 130 partially receives the diameter of control 24. In still another embodiment, channel 130 partially receives the diameter of control 24 and the positioning of control 24 against accessory 120 compresses the material of accessory 120 within channel 130 to further receive control 24.

In the particular embodiment illustrated, accessory 120 is solely held about handle 22 by the resilient, spring-like nature of the tube comprising accessory 120 and the friction created between the interior circumferential surface of accessory 120 and the exterior surface of handle 22. In alternative embodiments, adhesive or other releasable attachment mechanisms may be employed to releasably secure accessory 120 to handle 22. In still other embodiments, accessory 120 may be permanently coupled to handle 22. In still other embodiments, accessory 120 may be molded about handle 22. In still other embodiments, accessory 120 may alternatively be configured to be molded about, releasably coupled to or permanently coupled to a corresponding portion of control 24 in lieu of handle 22, wherein channel 130 receives handle 22 when control 24 is in the operational position.

ACCESSORY 220

FIG. 5 illustrates accessory 220, a second alternative embodiment of accessory 20, in use with handle 222 and control 224 of appliance 10. Although handle 222 and control 224 are illustrated as being substantially solid and as being substantially circular in cross section, handle 222 and control 224 may be hollow, may be made of different materials, and may have various shapes and configurations, as well as relative dimensions.

Accessory 220 generally comprises an elongate tube 225 having a compressible outer surface 226, an inner cavity 228, and an opening 230 communicating with the inner cavity 228. In the particular embodiment illustrated, tube 225 is formed entirely out of a compressible material such that outer surface 226 is also compressible. In an alternative embodiment, tube 225 is formed from a plurality of different materials, wherein some layers are compressible and other layers are not such that outer surface 226 may be compressed or moved towards handle 222. In one embodiment, outer surface 226 is defined by a compressible material. In another embodiment, outer surface 226 is bound by a layer of non-compressible material overlying at least one layer of compressible material. In the preferred embodiment, tube 225 is preferably formed from a compressible foam.

In one particular embodiment, outer surface 226 is relatively smooth and circular in cross section. In alternative embodiments, surface 226 is grooved, roughened or textured to facilitate non-slip gripping. In still alternative applications, surface 226 is shaped so as to have an uneven outer contour to provide an ergonomic fit for the user's hands. For example, surface 226 may have a depression in the shape of the user's hands.

Inner cavity 228 is bound by an interior surface 232 of tube 225. Surface 232 is preferably formed from a high-friction material which engages the exterior surface of handle 222 and prevents rotation of tube 225 relative to handle 222. Although not shown, in one particular embodiment, surface 232 may be formed from a layer of at least one high-friction material such as rubber and the like. In alternative embodiments, surface 232 may have a high degree of friction as a result of surface 232 being provided with a roughened texture, grooves, serrations or dimples which grasp or mate with the exterior surface of handle 222. In alternative embodiments, surface 232 may be provided with a layer of adhesive at least partially covering surface 232, wherein the adhesive either permanently attaches tube 225 to handle 222 or releasably adheres tube 225 to handle 222. Although less desirable, surface 232 may be defined by the same material as outer surface 225. Surface 232 may have a level of friction such that tube 225 is rotatable relative to handle 222.

Inner cavity 228 is generally sized to receive handle 222. Inner cavity 228 preferably has an inner shape which mates with the outer shape of handle 222. In alternative embodiments, cavity 228 may have a different shape as compared to handle 222.

Opening 230 extends between outer surface 226 and inner surface 232 of tube 225. Opening 230 is bound by ends 238 and 240. Tube 225 is sufficiently flexible along at least portions of tube 225 to permit ends 238 and 240 to be spread apart enabling handle 222 to be inserted through opening 230 into cavity 228. As a result, accessory 220 may be used with preexisting powered appliances and may be mounted to such powered appliances by the end user.

In the particular embodiment illustrated, opening 230 is a longitudinal slit extending the entire axial length of tube 225 to facilitate insertion of handle 222 through opening 230 into cavity 228. In alternative embodiments, opening 230 may comprise a slit or a cut-out opening extending only partially along the axial length of tube 225 such that tube 225 at least partially surrounds axial ends or end bent portions of handle 222. The exact shape and configuration of opening 230 may vary depending upon the configuration of handle 222.

As shown by FIG. 5, once accessory 220 is mounted to handle 222, control 224 is moved to the first position proximate to handle 222. Tube 225 preferably has a sufficient thickness and is sufficiently compressible such that control 224 may be at least partially surrounded by outer surface 226 when in the first position. In particular, control 224 is moved towards handle 222 such that control 224 compresses outer surface 226 towards handle 222. The compressibility of tube 225 is preferably provided such that a user may maintain control 224 in its compressing position such that outer surface 226 extends at least partially about control 224 using a normal degree of force such that the user's hands will not become overly fatigued from maintaining control 224 in the compressing state over prolonged periods of use such as up to several hours. At the same time, the compressibility of tube 225 is preferably provided such that tube 225 does not degrade as a result of such compression and such that tube 225 absorbs the shock and vibration associated with operation of the powered appliance. Outer surface 226 preferably extends at least 120 degrees about control 224 after control 224 is moved to the first position. As a result, the likelihood of control 224 and handle 222 pinching the user's hands therebetween is reduced. Preferably, outer surface 226 extends at least 180 degrees about control 224 when control 224 is in the first position. By surrounding control 224 to the greater extent, the likelihood of accidental pinching is reduced and a more comfortable grip is achieved. In the most preferred embodiment, outer surface 226 extends at least 270 degrees about control 224 when control 224 is in the first position. By overlapping control 224 by this even greater extent, the user may easily grasp both handle 222 and control 224 with a comfortable posture. In an optimum embodiment, outer surface 226 completely surrounds and envelops control 224 such that the possibility of pinching is eliminated and the entire peripheral grip is compressible.

ACCESSORY 320

Figure 6:
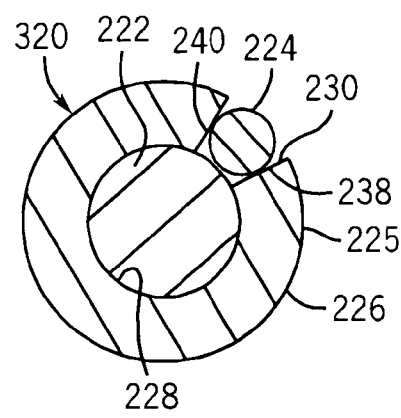
FIG. 6 is a sectional view of the appliance of FIG. 1 and a second alternative embodiment of the accessory of FIG. 1 illustrating the control in an operational position.

FIG. 6 illustrates accessory 320, a third alternative embodiment of accessory 20, employed with handle 222 and control 224. Accessory 320 is similar to accessory 220, except that accessory 320 is dimensioned relative to the dimensions of handle 222 such that when tube 225 receives handle 222, ends 238 and 240 are sufficiently spaced apart from one another such that opening 230, through which handle 222 is inserted into cavity 228, also provides a gap for the reception of control 224 when control 224 is in the first position. The thickness of tube 225 is preferably equal to or greater than the diameter or radial width of control 224 such that outer surface 226 extends outwardly above the outer most point of control 224. Although less desirable, tube 226 may have a lesser thickness such that the outer most point of control 224 projects beyond surface 226.

ACCESSORY 420

Figure 7:
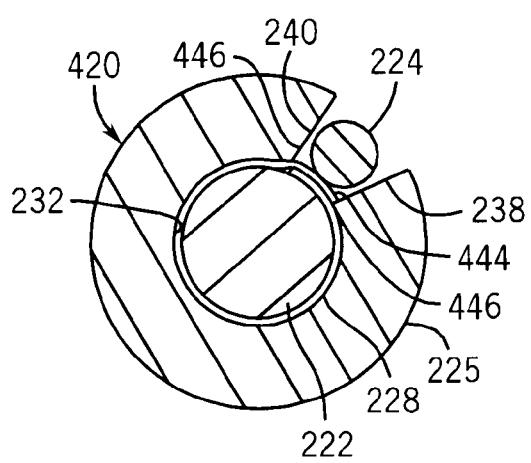
FIG. 7 is a sectional view of the appliance of FIG. 1 and a third alternative embodiment of the accessory of FIG. 1 illustrating the control in an operational position.

FIG. 7 illustrates accessory 420, a fourth alternative embodiment of accessory 20, employed with handle 222 and control 224. Accessory 420 is substantially identical to accessory 320 except that accessory 420 includes end retainer 444. End retainer 444 retains ends 238 and 240 relative to one another and relative to handle 222. As a result, the width of opening 238 is maintained without the user having to grip tube 225 so as to maintain ends 238 and 240 relative to one another. In the particular embodiment illustrated, retainer 444 comprises a pair of tabs or flaps 446 which project from ends 238 and 240 and which include a fastening mechanism. Such tabs or flaps are preferably adhered to tube 225. Alternatively, such tabs or flaps may be sewn, stitched, welded or otherwise coupled to tube 225. In the particular embodiment illustrated, the fastening mechanism comprises opposing hook and loop fastener components. Alternatively, the fastening mechanism may comprise adhesives, clasps, snaps, or various other conventionally known or future developed fastening mechanisms.

As shown in FIG. 7, retainer 444 extends below control 224 when control 224 is positioned within opening 230 in the first position. In alternative embodiments, retainer 444 may alternatively extend over and about control 224 or may extend along surface 232 of tube 225. When extending along surface 232, retainer 444 may comprise a permanent or releasable adhesive or a surface configured to interlock or mate with the exterior surface of handle 222. In one application, accessory 420 may be provided with a first component such as a panel carrying a first component of a hook and loop material which is permanently or releasably secured to handle 222 while a second component comprising a panel carrying a second component of a hook and loop fastener material is permanently or releasably secured to surface 232 of accessory 420, wherein upon cavity 228 receiving handle 222, tube 225 and its ends 238, 240 would be retained relative to one another and relative to tube 222 by the hook and loop connection. In alternative embodiments, the first and second panels may carry other fastening mechanisms. For example, the interior surface of tube 225 may alternatively be configured to hook or mechanically interlock with an appropriately configured exterior surface of handle 222. The interlocking surface provided on the exterior surface of handle 222 may be formed as part of handle 222 or may be permanently or releasably attached to handle 222.

ACCESSORY 520

Figure 8:
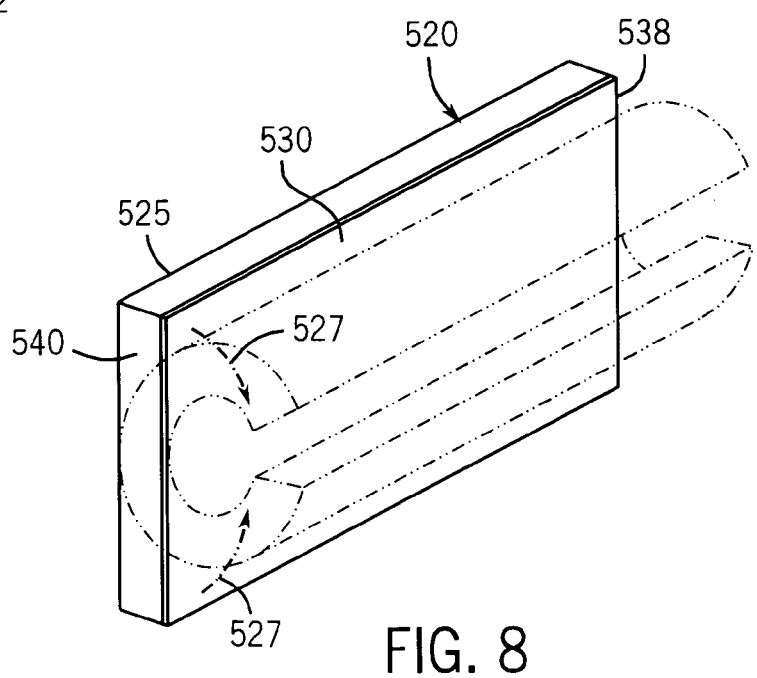
FIG. 8 is a perspective view of a fourth alternative embodiment of the accessory of FIG. 1 illustrating the formation of the accessory in phantom.

FIG. 8 illustrates accessory 520, a fifth alternative embodiment of accessory 20, for use with handle 222 and control 224 (shown in FIGS. 4–7). Accessory 520 generally comprises a sheet or panel 525 rather than a tube 225. Sheet 525 is sufficiently flexible along at least portions of its length enabling sheet 525 to be bent or in turned as indicated by arrows 527 to enable sheet 525 to be wrapped about handle 222. Once wrapped about handle 222, sheet 525 has the same general cross sectional shape as either tube 225 of accessory 220, or tube 225 of accessory 320. In the preferred embodiment, accessory 520 additionally includes a layer of adhesive 530 which secures sheet 525 to handle 222 and which also retains sheet 525 in its wrapped state. The adhesive 530 may be permanent or may be releasable in nature. Furthermore, in lieu of adhesive 530, other attachment mechanisms may be employed such as hook and loop mechanisms (similar to that described with respect to the alternative embodiment of FIG. 7) and the like. In addition to adhesive 530 or as an alternative to adhesive 530, accessory 530 may include a retainer similar to retainer 444

(described with respect to FIG. 7). In use, accessory 520 is wrapped about handle 222 to yield to configurations similar to accessories 220 or 320.

In each of the described embodiments in FIGS. 4–8, the accessories have been illustrated as being configured for extending about handle 222. In alternative embodiments, such accessories may alternatively extend substantially about control 224. For example, in one alternative embodiment, cavity 228 of accessory 220 may alternatively receive control 224, wherein handle 222 compresses the outer surface 226 of tube 225 such that outer surface 226 at least partially surrounds handle 222. Likewise, accessory 320 may alternatively be configured such that cavity 228 receives control 224 and such that handle 222 is received within a gap defined between ends of tube 225. Accessories 420, 520 and 620 may be configured in similar alternative fashions.

In each of accessories 220, 320, 420, 520 and 620, a sheet or tube of material is compressible. In addition, at least portions of the tube or sheet is movable, pivotable or flexible to permit the tube or sheet to receive either or both of handle 222 and control 224 within its inner cavity, with or without requiring wrapping about handle 222 or control 224.

The aforementioned accessories may also alternatively be used on a variety of other conventionally known or future developed powered appliances that have such a safety mechanism. For example, the accessories may alternatively be employed by powered appliances including, but not limited to, hedge trimmers, tillers, chain saws, edgers, snowblowers, wood choppers, and the like. The control may be associated with working members such as blades, appliance propulsion motive mechanisms or power trains, or other appliance moving parts. A single appliance may be provided with multiple controls associated with the same or different working members. In such appliances, a single flexible member may extend adjacent to the handle and all the controls or multiple flexible members may individually extend adjacent to the handle and each control. For example, in a self-propelling lawnmower, a single flexible member or multiple flexible members may be configured to provide a comfortable grip when both a first kill bar for the propulsion motive mechanism or power train and a second control member for the blades of the mower are simultaneously held adjacent to the handle of the lawnmower. In addition to having a multitude of applications, the present invention also has a variety of different configurations, structures and materials.

Although the present invention has been described with reference to example embodiments, workers skilled in the art will recognize that changes may be made in form and detail without departing from the spirit and scope of the invention. For example, although different example embodiments may have been described as including one or more features providing one or more benefits, it is contemplated that the described features may be interchanged with one another or alternatively be combined with one another in the described example embodiments or in other alternative embodiments. Because the technology of the present invention is relatively complex, not all changes in the technology are foreseeable. The present invention described with reference to the example embodiments and set forth in the above definitions is manifestly intended to be as broad as possible. For example, unless specifically otherwise noted, the definitions reciting a single particular element also encompass a plurality of such particular elements.

What is claimed is:

1. A powered appliance for use by an operator, the powered appliance comprising:
    a frame;
    wheels movably supporting the frame;
    a blade movably supported by the frame;
    a substantially horizontal handle extending along a first axis and coupled to the frame;
    a kill bar having an end portion extending along a second axis parallel to the first axis and pivotable about a third axis parallel to the first axis and the second axis between a first position proximate the handle in which movement of the blade is permitted and a second position distant the handle in which movement of the blade is at least reduced; and
    a layer of compressible material configured to deform or compress under the normal amount of force the operator could continuously apply to the layer during the period of time the powered appliance would normally be used during one session, wherein the layer partially extends about one of the handle and the kill bar to form a channel extending parallel to first axis and the second axis and wherein the channel is located and oriented to receive the other of the handle and the kill bar without substantial deformation of the layer when the kill bar is in the first position.

2. The appliance of claim 1, wherein the layer is formed from a foam.

3. The appliance of claim 1, wherein the layer extends about the handle.

4. The appliance of claim 1, wherein the powered appliance comprises a lawnmower.

5. The appliance of claim 1, wherein the kill bar comprises a bale arm.

6. The appliance of claim 1, wherein movement of the blade is cessated when the kill bar is in the second position.

7. The appliance of claim 1, wherein power to the blade is reduced when the kill bar is in the second position.

8. The appliance of claim 1, wherein the kill bar is biased towards the second position.

9. The appliance of claim 1, wherein the layer is releasably coupled to the at least one of the handle and the kill bar.

10. The appliance of claim 1, wherein the channel passes completely through the layer.

11. The appliance of claim 1, wherein the layer has a thickness equal to or greater than a thickness of the other of the handle and the kill bar received within the channel.

12. A method for equipping and operating a powered appliance including a frame, wheels supporting the frame, a blade, a handle coupled to the frame, and a kill bar pivotable between a first position proximate the handle in which movement of the blade is permitted and a second position distant to the handle in which movement of the blade is at least reduced, the method comprising:
    providing a tube having a compressible outer surface, an inner cavity, and an opening communicating with the inner cavity, the compressible outer surface being configured to compress so as to occupy a reduced volume under the normal amount of force an operator of the powered appliance could continuously apply to the compressible outer surface during the period of time the powered appliance would normally be used during one session;
    inserting one of the handle and the kill bar through the opening into the inner cavity; and moving the kill bar to the first position adjacent the tube such that at least a portion of the kill bar is within the opening and is surrounded by the outer surface.

13. The method of claim 12, wherein the opening comprises a longitudinal slit.

14. The method of claim 12, wherein the outer surface extends at least 120 degrees about the control after the kill bar has been moved to the first position.

15. The method of claim 12, wherein the outer surface extends at least 180 degrees about the control after the control has been moved to the first position.

16. The method of claim 12, wherein the outer surface extends at least 270 degrees about the control after the control has been moved to the first position.

17. The method of claim 12, wherein the opening extends completely through the compressible outer surface.

18. The method of claim 12, wherein the tube has a thickness greater than or equal to a thickness of the blade received within the opening.

19. A method for equipping and operating an powered appliance including a frame, wheels supporting the frame, a blade, a handle coupled to the frame, and a kill bar movable between a first position proximate the handle in which movement of the blade is permitted and a second position distant to the handle in which movement of the blade is at least reduced, the method comprising:
providing a flexible member having a first end and a second opposite end, the flexible member being configured to deform under the normal amount of force an operator of the powered appliance could continuously apply to the flexible member during the period of time the powered appliance would normally be used during one session;
wrapping the flexible member about one of the handle and the kill bar;
securing the first and second ends relative to one another about said one of the handle and the kill bar; and
moving the kill bar to the first position adjacent the flexible member such that at least a portion of the control is surrounded by the flexible member, wherein the wrapping operation includes spacing the first and second ends from one another to form a gap therebetween and wherein the operation of moving the kill bar includes positioning the other of the handle and the kill bar within the gap.

20. The method of claim 19, wherein the flexible member extends at least 120 degrees about the kill bar after the kill bar has been moved to the first position.

21. The method of claim 19, wherein the outer surface extends at least 180 degrees about the kill bar after the kill bar has been moved to the first position.

22. The method of claim 19, wherein the flexible member extends at least 270 degrees about the kill bar after the kill bar has been moved to the first position.

23. The method of claim 19, wherein the securing operation includes releasably coupling the first end to the second end.

24. The method of claim 19, wherein the flexible member includes an inner surface and outer surface and wherein the securing operation includes adhering the inner surface to said one of the handle and the kill bar.

25. The method of claim 19, wherein the flexible member has an inner surface including means for preventing movement of the flexible member relative to said one of the handle and the kill bar.

26. The method of claim 19, wherein the gap extends completely through the flexible member.

27. The method of claim 19, wherein the flexible member has a thickness greater than or equal to a thickness of the kill bar received within the gap.

28. A lawnmower comprising:
a frame;
wheels movably supporting the frame;
a blade configured to rotate about a vertical axis;
a handle coupled to the frame and having a substantially horizontal manual gripping portion;
a kill bar configured to pivot between a first position proximate the handle in which movement of the blade is permitted and a second position distant the handle in which movement of the blade is slowed or stopped; and
a compressible layer extending partially about the handle so as to form a channel adjacent to and along the handle, the channel being oriented and a sized so as to receive the kill bar without substantial deformation of the layer when the kill bar is pivoted to the first position.

29. The lawnmower of claim 28, wherein the compressible layer comprises a slitted tube.

30. The lawnmower of claim 28, wherein the channel as a depth so as to extend at least 120 degrees about the kill bar when the kill bar in the first position.

31. The lawnmower of claim 28, wherein the compressible layer is removably positioned about the handle.

32. The lawnmower of claim 28, wherein the compressible layer as an exterior surface configured to absorb or wick away perspiration.

33. The lawnmower of claim 28, wherein the compressible layer comprises a tube having an inner diameter less than an inner diameter of the handle.

34. The lawnmower of claim 28, wherein the compressible layer comprises a two in early formed as a new unitary body of a single material.

35. The lawnmower of claim 28, wherein the compressible layer has an outer surface that is grooved.

36. The lawnmower of claim 28, wherein the compressible layer has an outer surface that is textured.

37. The lawnmower of claim 28, wherein the channel has a depth so as to extend at least 180 degrees about the kill bar when the kill bar is in the first position.

38. The lawnmower of claim 28, wherein the channel has a depth so as to extend at least 270 degrees about the kill bar when the kill bar is in the first position.

* * * * *